United States Patent
Scherer et al.

(10) Patent No.: US 12,416,748 B2
(45) Date of Patent: Sep. 16, 2025

(54) OPTICAL LAYER HAVING A LOW REFRACTIVE INDEX AND METHODS OF FABRICATION

(71) Applicant: California Institute of Technology, Pasadena, CA (US)

(72) Inventors: Axel Scherer, Barnard, VT (US); Taeyoon Jeon, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1023 days.

(21) Appl. No.: 17/335,946

(22) Filed: Jun. 1, 2021

(65) Prior Publication Data

US 2021/0373208 A1  Dec. 2, 2021

Related U.S. Application Data

(60) Provisional application No. 63/033,405, filed on Jun. 2, 2020.

(51) Int. Cl.
*G01N 21/35* (2014.01)
*G01J 3/02* (2006.01)
*G02B 5/08* (2006.01)

(52) U.S. Cl.
CPC .......... *G02B 5/0816* (2013.01); *G01J 3/0208* (2013.01); *G01N 21/35* (2013.01)

(58) Field of Classification Search
None
See application file for complete search history.

(56) References Cited

U.S. PATENT DOCUMENTS

| 9,518,917 | B2 | 12/2016 | Scherer et al. |
| 11,025,175 | B1 * | 6/2021 | Landig ................ G06F 3/016 |
| 11,079,518 | B1 * | 8/2021 | Smyth ................ H10N 30/87 |
| 2007/0048513 | A1 | 3/2007 | Okamoto et al. |
| 2014/0268348 | A1 | 9/2014 | Jewhurst et al. |
| 2016/0231504 | A1 | 8/2016 | Logunov |
| 2018/0102043 | A1 * | 4/2018 | Starkey ................ B62B 3/04 |
| 2018/0305472 | A1 | 10/2018 | Kobori et al. |

FOREIGN PATENT DOCUMENTS

WO   2019/244142 A2   12/2019

OTHER PUBLICATIONS

Authorized Officer: Harry Kim, International Search Report and Written Opinion issued in PCT application No. PCT/US2021/035253, Sep. 1, 2021, 8 pp.
Compact Hyperspectral Mid-Infrared Spectrometer, U.S. Appl. No. 16/782,674.

* cited by examiner

*Primary Examiner* — Sheeba Ahmed
(74) *Attorney, Agent, or Firm* — Kaplan Breyer Schwarz, LLP (57) ABSTRACT

The teachings of the present disclosure enable a reduction of the refractive index of a material by incorporating an additive selected from air, vacuum, or an inert gas in the material to turn the material into a material foam that is suitable for use in optical systems. A material foam in accordance with the present disclosure is characterized by a porosity that reduces its refractive index from that of the same material as found in nature. The higher porosity also decreases the density of the material from that of the same material as found in nature. Material foams in accordance with the present disclosure are suitable for use in the low-refractive-index layers of a Bragg mirror.

20 Claims, 5 Drawing Sheets

OPTICAL LAYER HAVING A LOW REFRACTIVE INDEX AND METHODS OF FABRICATION

STATEMENT OF RELATED CASES

This case claims priority of U.S. Provisional Patent Application Ser. No. 63/033,405, filed Jun. 2, 2020, which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure is directed to optics in general and, more specifically, to reflectors based on Bragg structures.

BACKGROUND

A Bragg mirror is a multi-layer structure made of an alternating sequence of layers of two optical materials that have relatively higher and lower refractive indices. Bragg mirrors can have very high reflectivity, which is essential for the construction of filters, resonators, and other widely used devices for controlling light; therefore, Bragg mirrors have found widespread use in many optical applications as anti-reflection coatings, laser-facet mirrors, beam splitters, spectral filters, and more.

In many applications, it is highly desirable for a Bragg mirror to have a large free spectral range (FSR) to enable it to be reflective over a wide wavelength range. Both FSR and the angle-dependent spectral response of a Bragg mirror are based on the number of layer pairs it includes and the refractive-index contrast between its high- and low-refractive-index layers. To realize a Bragg mirror having high reflectivity and large FSR, materials having the highest and lowest possible refractive indices are desirable.

Unfortunately, the available refractive indices for conventional optical materials is limited—particularly for materials suitable for use in the lower-refractive-index layers of a Bragg mirror. In the prior art, the best low-refractive-index-material candidates available in nature are typically considered to be fluorides (n~4.35), polymers (n~1.4) and, when its use is possible, air (n=1.0), which represents a hard minimum for the low-refractive-index material. Layers of these materials, however, can be expensive and/or difficult to implement in a practical Bragg mirror.

The need for a practical, ultra-low-refractive-index material suitable for use in a Bragg mirror structure remains, as yet, unmet in the prior art.

SUMMARY

The teachings of the present disclosure are directed to materials that are altered to realize a refractive index that is lower than that of the same material as found in nature (i.e., in its unaltered state). A material in accordance with the present disclosure is altered by forming it as a material "foam," in which a typically large volume-fraction of one or more of air, vacuum, and inert gas is incorporated. Materials in accordance with the teachings of the present disclosure can have refractive indices that approach the physical limit of n=1 and are particularly well suited for use in Bragg-mirror structures, resonant-cavity spectral filters, spectrally selective chemical sensors, and the like.

An advance over the prior art is realized by forming a composite material that includes the material of interest and one or more additives (e.g., air, vacuum, inert gas, etc.), the combination of which is analogous to a material "foam." By converting a material into a material foam, the refractive index of the material is reduced significantly, while still enabling the formation of smooth, optically useful layers. In addition, control over the composition of the material foam and, therefore, its optical properties, can be achieved through controlling the rate at which the material foam is deposited and/or controlling substrate temperature and/or pressure during its deposition onto a substrate. Furthermore, the optical absorption and/or scattering characteristics of the material are improved by the incorporation of an additive, such as air, vacuum, or the inert gas, which convolves the natural absorption characteristics of the material with those of the additive that is incorporated in the material.

An illustrative embodiment in accordance with the present disclosure is a fluoride foam having a refractive index that is approximately 1.1. The fluoride foam is formed by the vapor deposition of the fluoride material in an atmosphere that includes inert gas (e.g., argon), which gives rise to a highly porous fluoride foam.

In some embodiments, the porosity and/or refractive index of a material foam is controlled by controlling at least one of deposition rate, substrate temperature, and chamber pressure during deposition.

In some embodiments, a material foam is formed by co-depositing a first material and a sacrificial material to form a nascent layer of second material. Once the nascent layer is formed, it is subjected to a sacrificial etch that selectively removes the sacrificial material, thereby leaving behind a low-density layer of material foam throughout which pores are uniformly distributed.

In some embodiments, a material foam is encapsulated with an encapsulation layer to mitigate irreversible degradation due to environmental exposure, such as oxidation, water absorption, corrosion, and the like.

An embodiment in accordance with the present disclosure is a composition having a first layer that is at least partially transparent for a light signal, the first layer including a first material comprising: a second material having a natural density and a natural refractive index; and an additive that is substantially uniformly distributed throughout the second material; wherein the first material has a first refractive index that is lower than the natural refractive index, and wherein the first refractive index is based on the volume-fraction of the additive in the first material.

Another embodiment in accordance with the present disclosure is a method including: forming a composition that is at least partially transmissive for a light signal by operations including: providing a first material having a natural density and a natural refractive index; and increasing the porosity of the first material by substantially uniformly distributing an additive throughout the first material to form a second material; wherein the second material has a first refractive index that is lower than the natural refractive index.

DETAILED DESCRIPTION

Figure 1:
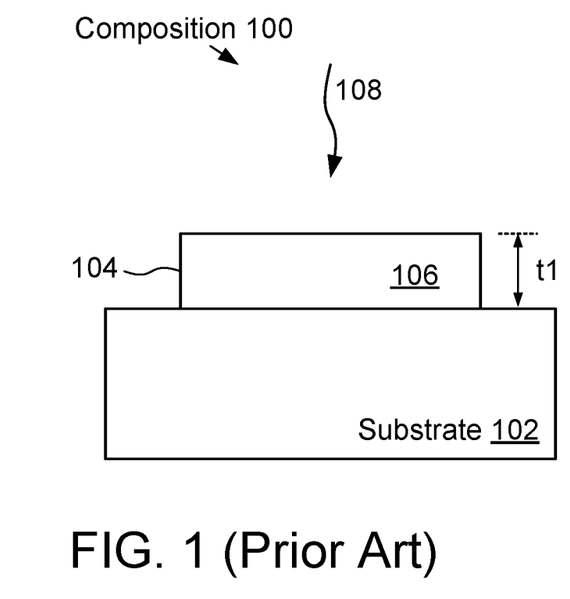
FIG. 1 depicts a schematic drawing of a cross-sectional view of a composition comprising a layer of material in its natural state in accordance with the prior art.

FIG. 1 depicts a schematic drawing of a cross-sectional view of a composition comprising a layer of material in its natural state in accordance with the prior art. Composition 100 includes layer 104, which is disposed on conventional substrate 102.

Layer 104 is a layer of material 106 having thickness, t1, where the material is substantially in its pure, bulk state (i.e., the material of layer 104 is in an unaltered state and does not intentionally include significant amounts of any other material/element within it). Layer 104 can be formed on substrate 102 via any of myriad deposition methods that are well known to one skilled in the art.

As will be apparent to one skilled in the art, the material and optical properties of the material of a deposited layer can be affected slightly by the manner in which it is deposited; however, the variation of these properties due simply to deposition conditions, without intentional incorporation of other materials/elements, is considered to be negligible for the purposes of this disclosure.

Material 106 is a conventional material in which it is possible to incorporate a large volume-fraction of an additive, such as air, vacuum, inert gas, or a combination thereof. Material 106 is characterized by a natural density and a natural refractive index. For the purposes of this Specification, including the appended claims, the "natural density" of a material is defined as the density of the material when it is in its substantially pure, as-deposited or bulk form without the intentional incorporation of air, vacuum, or inert gas within it. In similar fashion, the "natural refractive index," of a material is defined as the refractive index of the material when it is in its substantially pure, as-deposited or bulk form without the intentional incorporation of air, vacuum, or inert gas within it.

In the depicted example, material 106 is high-density fluoride that is substantially transparent for the wavelength of light signal 108. Material 106 is characterized by its natural density and having a natural refractive index of approximately 1.4. It should be noted, however, that other materials suitable for use as material 106, such as fluoride compounds, polymers, polymer compounds, and the like, will be apparent to one skilled in the art after reading this disclosure.

In the depicted example, light signal 108 has a wavelength of approximately 9 microns and layer 104 is configured such that is has a thickness equal to one-quarter of the wavelength of light signal 108 (within the layer). As a result, in the depicted example, the value of t1 is approximately 1.61 microns.

Figure 2:
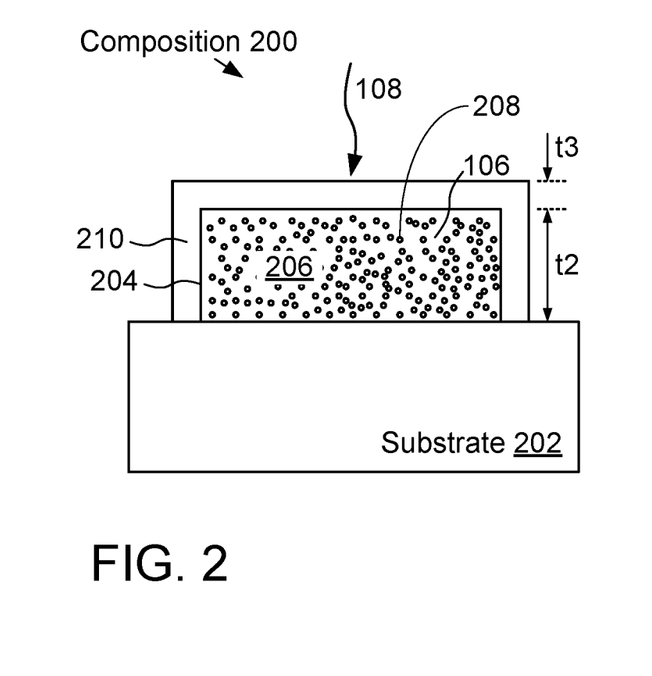
FIG. 2 depicts a schematic drawing of a cross-sectional view of a composition comprising a layer of material foam in accordance with the present disclosure.

FIG. 2 depicts a schematic drawing of a cross-sectional view of a composition comprising a layer of material foam in accordance with the present disclosure. Composition 200 includes layer 204, which is disposed on substrate 202.

Figure 3:
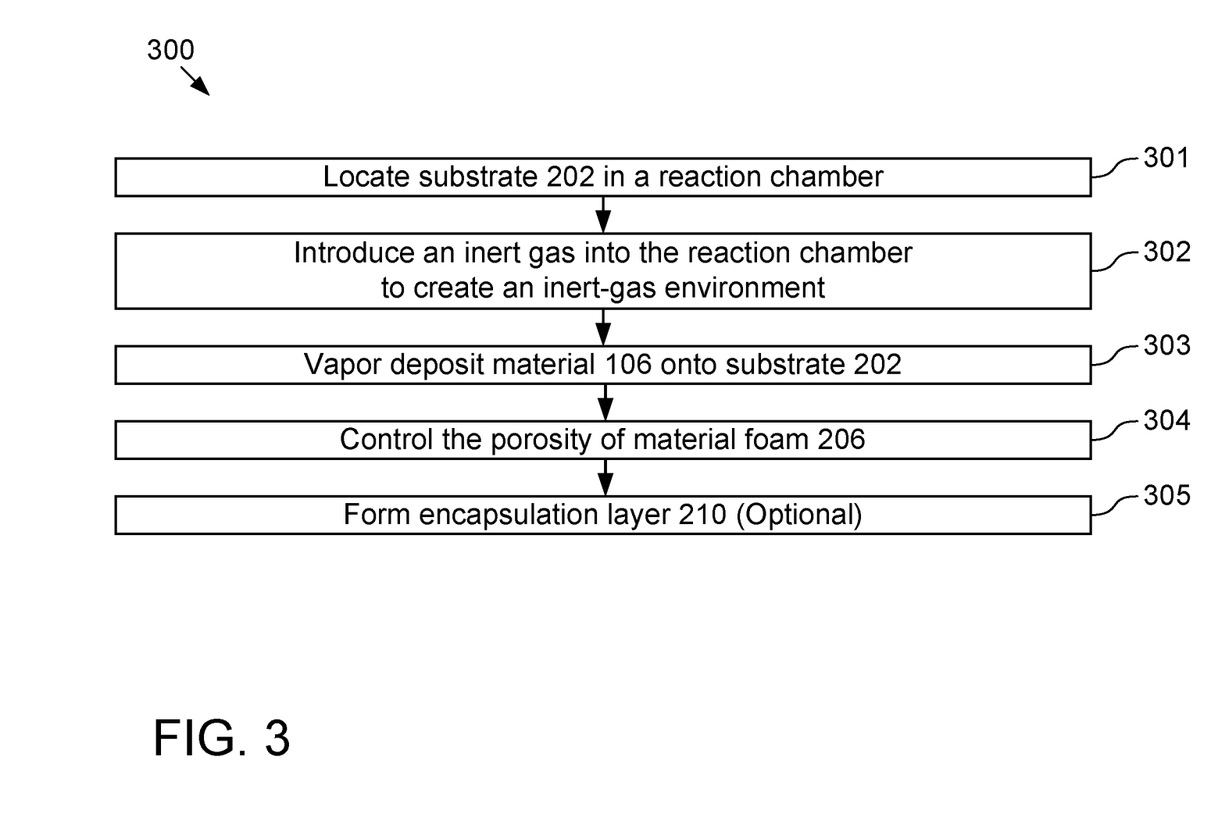
FIG. 3 depicts operations of a method suitable for forming a material foam in accordance with the present disclosure.

FIG. 3 depicts operations of a method suitable for forming a material foam in accordance with the present disclosure. Method 300 begins with operation 301, in which substrate 202 is located in a reaction chamber (not shown).

Figures 4A, 4B, 4C:
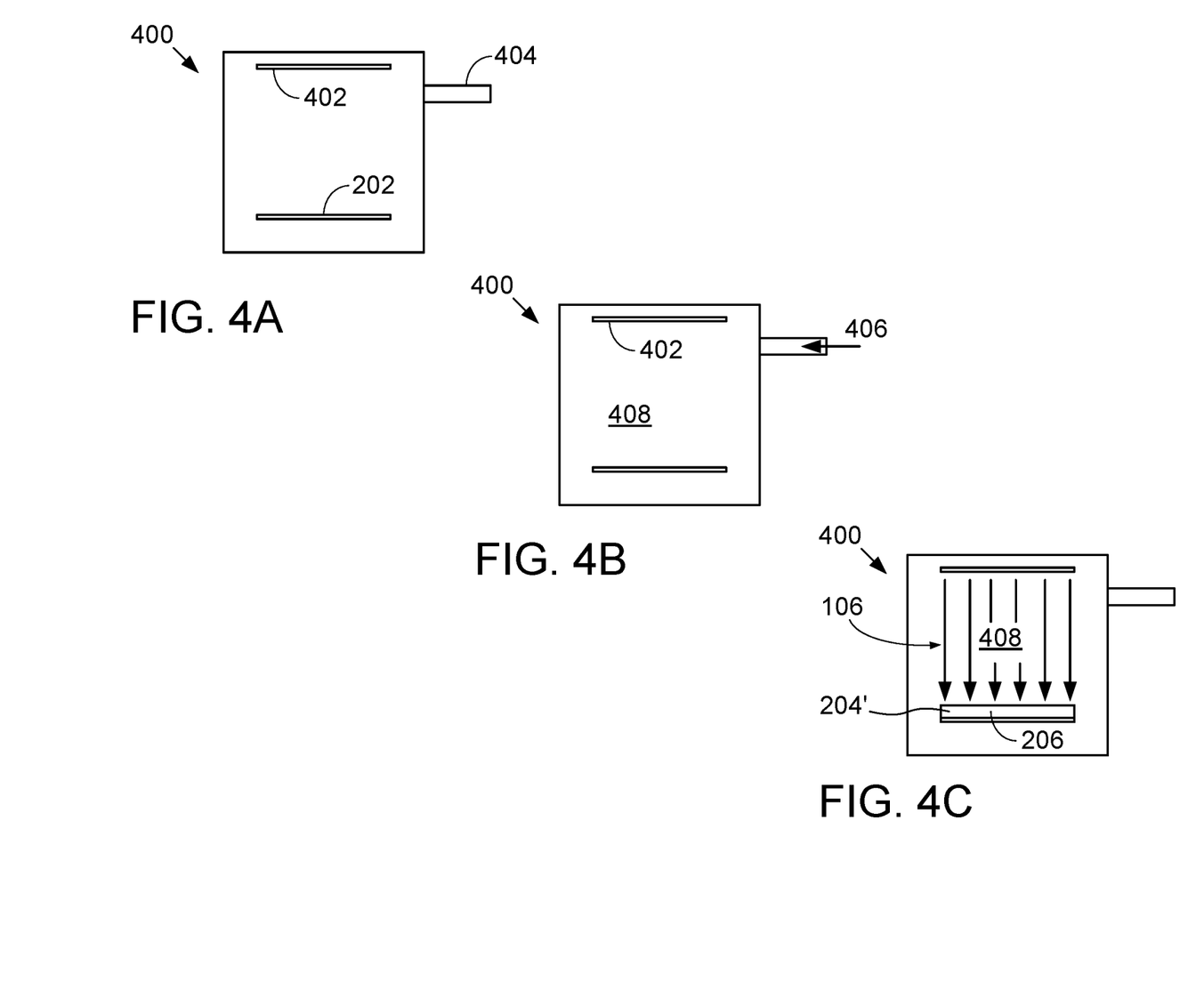
FIGS. 4A-C depict schematic drawings of layer 204 at different stages of its fabrication in accordance with the present disclosure.

FIGS. 4A-C depict schematic drawings of layer 204 at different stages of its fabrication in accordance with the present disclosure.

Method 300 begins with operation 301, in which substrate 202 is located in a reaction chamber 400.

FIG. 4A depicts reaction chamber 400 after the location of substrate 202.

In the depicted example, substrate 202 is a conventional substrate suitable for use in a planar processing fabrication sequence. In the depicted example, substrate 202 is a conventional silicon wafer; however, in some embodiments, substrate 202 is a different substrate and/or comprises a different material. Materials suitable for use in accordance with the teachings of the present disclosure include glasses, plastics, compound semiconductors, compound materials, germanium, dielectrics, and the like. In some embodiments, substrate 202 is removed after the formation of one or more layers 204 upon it. In some embodiments, substrate 202 is other than a planar-processing substrate, such as a bulk optical element (e.g., a lens, prism, beam-splitter, etc.), a laser facet, steerable MEMS mirror, and the like.

Reaction chamber 400 is a conventional reaction chamber suitable for the vapor deposition of an optical material on a substrate. Reaction chamber 400 includes source 402 and gas port 404.

Source 402 is a source suitable for vaporizing material 106 within reaction chamber 400. In the depicted example, source 402 is a thermal-evaporation crucible that holds pellets of material 106.

At operation 302, inert gas 406 is introduced into the reaction chamber at gas port 404 to create inert-gas environment 408 within the reaction chamber. In the depicted example, inert gas 406 is argon; however, any suitable inert gas can be used without departing from the scope of the present disclosure.

FIG. 4B depicts reaction chamber 400 after inert-gas environment 408 has been established.

At operation 303, material 106 is vapor deposited on substrate 202 through inert-gas environment 408, thereby forming layer 204 as material foam 206. Vapor-deposition techniques suitable for the formation of layer 204 includes, without limitation, thermal evaporation, electron-beam (E-beam) evaporation, sputtering, laser deposition, chemical vapor deposition (CVD), atomic-layer epitaxy (ALE), and the like.

In some embodiments, material foam 206 is formed by co-depositing material 106 and a sacrificial material to form a nascent layer of a composite material. Once this nascent layer is formed, it is subjected to a sacrificial etch that selectively removes the sacrificial material, which realizes a highly porous layer of first material whose pores are substantially uniformly distributed.

At operation 304, the porosity of material foam 206 is controlled. In some embodiments, the porosity is controlled by controlling the deposition rate of material 106. For example, very fast deposition of material 106 can realize a resultant layer 204 having very high porosity, while slower deposition results in a higher-density material foam. In some embodiments, porosity is controlled by controlling substrate temperature and/or chamber pressure during deposition. For example, deposition of material 106 at a high substrate temperature reduces porosity of the resultant material foam because it enables surface diffusion of materials during the deposition process, while increased the pressure in the chamber (e.g., by increasing the amount of inert gas) can increase the porosity of the resultant material foam.

FIG. 4C depicts reaction chamber 400 during the formation of nascent layer 204' as material foam 206 deposits on substrate 202.

Once formed, layer 204 is a layer of material foam 206 having thickness, t2, where material foam 206 is a mixture of material 104 and additive 208, which constitutes a large volume-fraction of layer 204. In the depicted example, additive 208 is air that is distributed, in substantially uniform fashion, throughout material 104. In some embodiments, additive 208 includes vacuum, one or more inert gasses, or a combination of at least one of air, vacuum, and inert gas.

By virtue of the distribution of additive 208 within it, material foam 206 is characterized density by a density that is significantly lower than that of material 106. As a result, for the same amount of material 106, the thickness, t2, of layer 204 is significantly greater than the thickness of layer 104. Furthermore, the inclusion of additive 208 in material foam 206 significantly reduces is refractive index. In the depicted example, material foam 206 has a substantially uniform refractive index of 1.1—significantly lower than that of material 106 and approaching the physical limit of n=1.0 for air.

Layer 204 is configured such that is has a thickness equal to one-quarter of the wavelength of light signal 108 within the layer. Since light signal 108 has a wavelength of approximately 9 microns, the value of t2 is approximately 2.045 microns.

Furthermore, the absorption characteristics of layer 204 can be controlled by controlling the porosity of material 206, since the low absorption characteristics of the incorporated air (or vacuum or inert gasses) dilute the natural material absorption of material 106 to further decrease overall absorption loss.

By judicious control of the deposition process for material 106, layer 204 can be formed with an extremely smooth top surface, which facilitates its use as an optical layer.

A smooth top surface also enables additional layers to be formed on layer 204 without incurring significant roughening in these additional layers, thereby mitigating scatter loss in multi-layer structures.

It should be noted that, in the prior art, porous materials are widely considered unsuitable for use in optical devices because they normally suffer from deterioration through oxidation, water absorption, corrosion and other irreversible deterioration mechanisms. It is an aspect of the present disclosure, however, that porous materials can be encapsulated with another material configured to protect the porous material from degradation due to environmental exposure.

In some embodiments, therefore, method 300 continues with optional operation 305, wherein encapsulation layer 210 is formed over the exposed surfaces of layer 204. In the depicted example, encapsulation layer 210 is a layer of germanium (n=4) having thickness, t3, which is equal to one-quarter of the wavelength of light signal 108 (i.e., t3=0.56 microns).

In some embodiments, layers in accordance with the present disclosure are particularly well suited for use as the relatively lower refractive-index layers of a Bragg mirror. It is another aspect of the present disclosure that, by terminating such a Bragg-mirror structure with a high-refractive-index layer, this high-refractive-index layer can be configured such that it also functions as encapsulation layer 210.

Figure 5A:
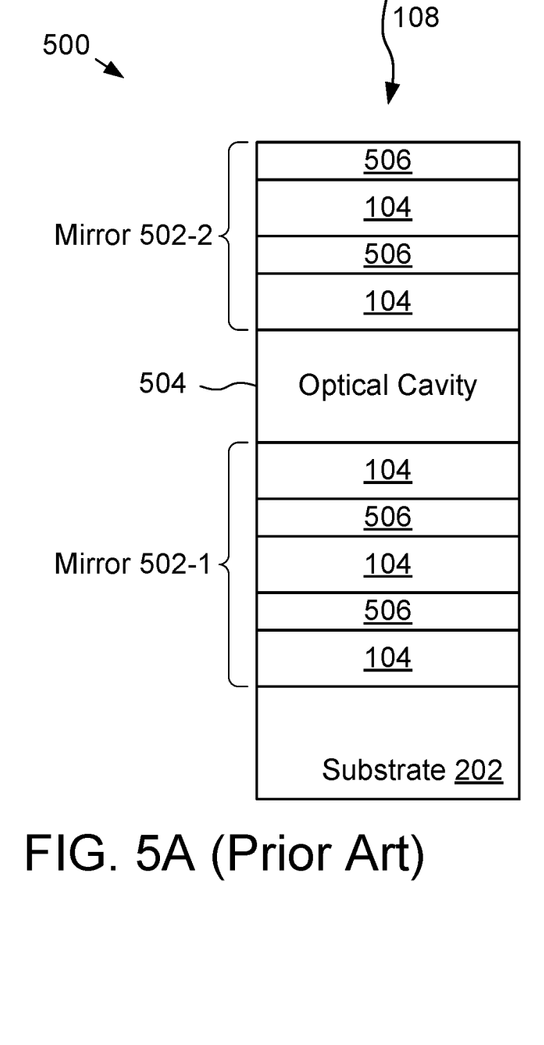
FIG. 5A depicts a schematic drawing of a cross-sectional view of a Fabry-Perot-cavity-based spectral filter comprising a pair of Bragg mirrors in accordance with the prior-art.

FIG. 5A depicts a schematic drawing of a cross-sectional view of a Fabry-Perot-cavity-based spectral filter comprising a pair of Bragg mirrors in accordance with the prior-art. Filter 500 includes Bragg mirrors 502-1 and 502-2 and optical cavity 504.

Each of Bragg mirrors 502-1 and 502-2 (referred to, collectively, as mirrors 502) includes a plurality of high-refractive-index layers 506 and low-refractive-index layers 104 whose thickness is equal to one-quarter of the wavelength of light signal 108 in its respective material. In the depicted example, each of high-refractive-index layers 506 is a quarter-wave-thick layer of germanium having thickness t3, and each of low-refractive-index layers 104 is a quarter-wave-thick layer of high-density fluoride having thickness, t1, as described above and with respect to FIG. 1.

Optical cavity 504 is a layer of germanium having a thickness equal to approximately one-half the wavelength of light signal 108 (i.e., approximately 1.125 microns).

Figure 5B:
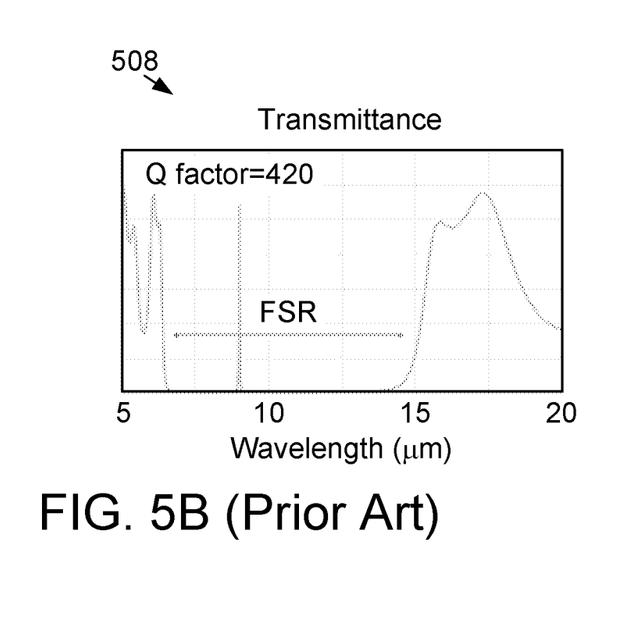
FIG. 5B depicts a plot of the transmissivity of filter 500 with respect to wavelength.

FIG. 5B depicts a plot of the transmissivity of filter 500 with respect to wavelength. As seen from plot 508, the range over which the transmittance of filter 500 is less than 1% (i.e., its FSR) is approximately 7.88 microns. In addition, of filter 500 is characterized by a relatively broad transmission peak having a quality factor of approximately 420.

Figure 6A:
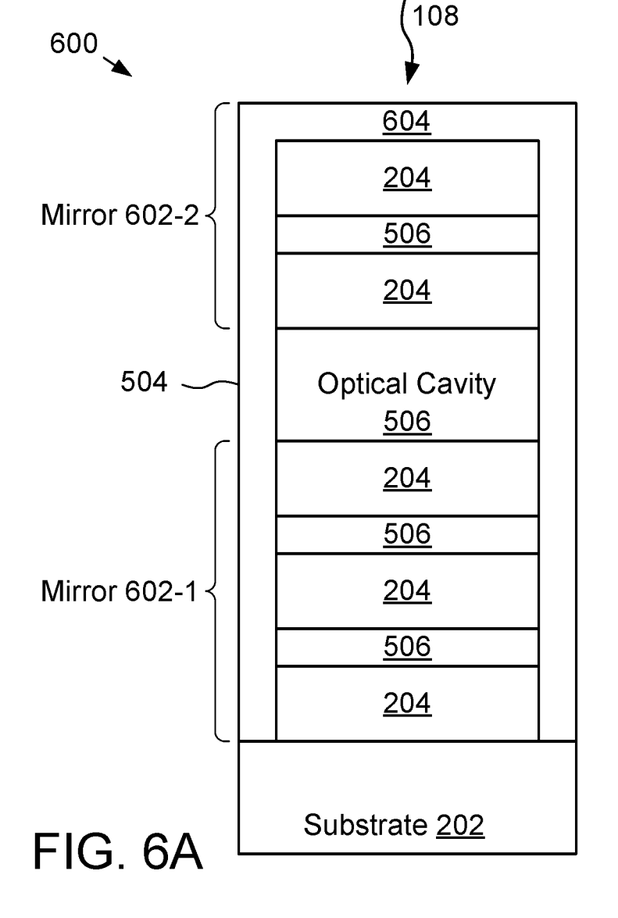
FIG. 6A depicts a schematic drawing of a cross-sectional view of a Fabry-Perot-cavity-based spectral filter comprising a pair of Bragg mirrors in accordance with the present disclosure.

FIG. 6A depicts a schematic drawing of a cross-sectional view of a Fabry-Perot-cavity-based spectral filter comprising a pair of Bragg mirrors in accordance with the present disclosure. Filter 600 includes Bragg mirrors 602-1 and 602-2 and optical cavity 504.

Each of Bragg mirrors 602-1 and 602-2 (referred to, collectively, as mirrors 602) includes a plurality of high-refractive-index layers 506 and low-refractive-index layers 204, which are quarter-wave thick layers of material foam 206 (i.e., having thickness t2), as described above and with respect to FIG. 2.

Bragg mirror 602-2 terminates at its top surface with encapsulation layer 604, which is disposed on all exposed surfaces of the underlying layers of filter 600. Encapsulation layer 604 is configured to function as both a quarter-wave high-refractive-index layer of mirror 602-2 and as an encapsulation layer that protects all otherwise exposed surfaces of layers 204 from environmental degradation mechanisms, such as oxidation, impurity absorption, etc.

It should be noted that, although the depicted example includes a fixed-length optical cavity, in some embodiments, the optical cavity of filter 600 is an air gap and at least one of mirrors 602-1 and 602-2 is movable relative to the other, thereby defining a tunable spectral filter.

Figure 6B:
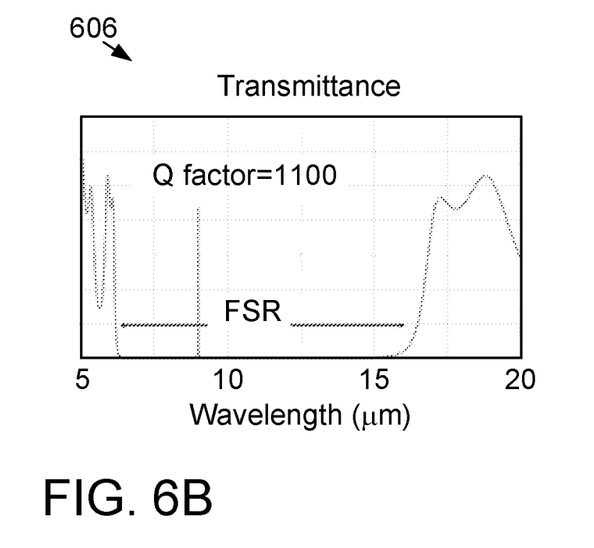
FIG. 6B depicts a plot of the transmissivity of filter 600 with respect to wavelength.

FIG. 6B depicts a plot of the transmissivity of filter 600 with respect to wavelength. As seen from plot 606, by employing lower-density fluoride foam instead of high-density fluoride in its low-refractive-index layers, filter 600 is characterized by a larger FSR than filter 500 (approximately 9.74 microns) and a much narrower transmission peak that has a significantly higher quality factor of approximately 1100.

It should be noted that the teachings of the present disclosure afford several significant advantages over the prior art, including:

i. very high-reflectivity mirrors can be formed using fewer high- and low-refractive-index layer pairs, thereby reducing fabrication complexity and cost; or ii. practical very high-Q optical microresonators are possible, which can be used to filter light without the need for additional filters required in the prior art to avoid transmitted light in the spectral regions not covered by the high reflectivity spectrum of the filter structure (i.e., its FSR); or iii. the refractive index of the low-refractive-index layers of a Bragg structure can be significantly lower, thereby enabling the structure to have higher refractive-index contrast, which in turn enables larger FSR, sharper transmission peaks, and higher quality factors; or iv. dependency to the angle of incidence of light signal 108 can be reduced; or v. any combination of i, ii, iii, and iv.

In some embodiments, an array of filters 600 is formed, each having a transmission peak at a different wavelength, such that the filter array can be used as at least a part of a set of spectrally selective sensors. By combining such a filter array with an array of detectors, spectroscopy can be performed to, for example, identify one or more chemicals in a test sample. Furthermore, since the teachings of the present disclosure are well suited for use at mid-infrared wavelengths, embodiments in accordance with the present disclosure are suitable for use in mid-infrared spectroscopy systems. Examples of mid-infrared spectroscopy systems for which the teachings of the present disclosure are suitable are disclosed in U.S. Pat. No. 9,518,917 and U.S. patent application Ser. No. 16/782,674, each of which is incorporated herein by reference.

Still further, by forming optical cavity 506 as an air gap and enabling relative motion between mirrors 602-1 and 602-2, a tunable spectral filter can be realized. Such a tunable spectral filter would be attractive for use in, for example, infrared spectroscopy or optical coherence tomography (OCT), among other applications.

It is to be understood that the disclosure teaches just some examples of embodiments in accordance with the present invention and that many variations of the invention can easily be devised by those skilled in the art after reading this disclosure and that the scope of the present invention is to be determined by the following claims.

What is claimed is:

1. An article comprising:
a first layer consisting of a fluoride foam that is at least partially transparent to a first light signal, the fluoride foam consisting of:
a) a solid-phase material, wherein the solid-phase material is fluoride; and
b) a vapor-phase additive uniformly distributed throughout the solid-phase material and that creates porosity in the solid material,
wherein a refractive index of the fluoride foam is lower than a refractive index of the solid-phase material.

2. The article of claim 1 wherein the fluoride foam has a refractive index of 1.1.

3. The article of claim 1 comprising an encapsulation layer that encapsulates the first layer, thereby preventing exposure thereof to an environment external to the first layer, and wherein the encapsulation layer is at least partially transparent for the first light signal.

4. The article of claim 3 wherein the encapsulation layer comprises germanium.

5. The article of claim 3 wherein the encapsulation layer has a thickness equal to m*l/4, where m is an odd integer and l is a wavelength included in the first light signal.

6. The article of claim 1 wherein the first layer has a thickness equal to m*l/4, where m is an odd integer and l is a wavelength included in the first light signal.

7. The article of claim 5 wherein the first layer has a thickness equal to m*l/4, where m is an odd integer and l is a wavelength included in the first light signal.

8. The article of claim 1 wherein the article is a Bragg structure, wherein the Bragg structure includes the first layer and a second layer, wherein the second layer comprises a material that is substantially transparent for the first light signal and has a relatively higher refractive index than the first layer.

9. The article of claim 1 wherein the article is a first Bragg mirror, wherein the first Bragg mirror includes:
a first plurality of the first layers and a first plurality of second layers, each second layer comprising a material that is substantially transparent to the first light signal and having a relatively higher refractive index than each first layer, and wherein:
(a) the first plurality of the first layers and first plurality of the second layers are interleaved, and
(b) each of the first layers and each of the second layers has a thickness that is equal to m*l/4, where m is an odd integer and l is a wavelength included in the first light signal.

10. The article of claim 9 wherein the material is germanium.

11. The article of 9 wherein the article is a Fabry-Perot cavity-based spectral filter comprising the first Bragg mirror, a second Bragg mirror, and an optical cavity, wherein:
(a) the second Bragg mirror includes a second plurality of the first layers and a second plurality of the second layers, and wherein:
(i) the second plurality of the first layers and second plurality of the second layers are interleaved, and
(ii) each of the first layers of the second plurality and each of the second layers of the second plurality has a thickness that is equal to m*l/4, where m is an odd integer and l is a wavelength included in the first light signal; and
(b) the optical cavity is disposed between the first Bragg mirror and the second Bragg mirror, and wherein the optical cavity has a thickness equal to n*l/4, where n is an even integer.

12. The article of claim 11 wherein the optical cavity comprises a layer of germanium.

13. The article of claim 11 wherein the optical cavity is an air gap.

14. The article of claim 13 wherein one of the Bragg mirrors is movable with respect to the other of the Bragg mirrors, thereby defining a tunable spectral filter.

15. The article of claim 9 wherein an uppermost layer of the first Bragg mirror is one of the second layers, and wherein the one second layer is configured to function as an encapsulation layer, covering any exposed surfaces of underlying first plurality of first layers and first plurality of second layers of the first Bragg mirror, the optical cavity, and the second Bragg mirror.

16. An article comprising:
a first layer consisting of a material foam that is at least partially transparent for a first light signal and has a thickness that is equal to m*l/4, where m is an odd integer and l is a wavelength included in the first light signal, the material foam consisting of:
(i) a solid-phase material, and (ii) a vapor-phase additive uniformly distributed throughout the solid-phase material and that creates porosity in the solid material, and wherein
a refractive index of the material foam is lower than a refractive index of the solid-phase material; and
a second layer, wherein the second layer comprises a material that:
(i) is substantially transparent for the first light signal,
(ii) has a relatively higher refractive index than the first layer, and
(iii) has a thickness that is equal to m*l/4, where m is an odd integer and l is a wavelength included in the first light signal.

17. The article of claim 16 comprising an encapsulation layer, wherein the encapsulation layer encapsulates the first layer and the second layer, and wherein the encapsulation layer is at least partially transparent to the first light signal.

18. The article of claim 16 wherein the solid-phase material is fluoride.

19. The article of claim 16 wherein the material of the second layer is germanium.

20. An article comprising:
a first plurality of first layers that are at least partially transparent to a first light signal, wherein each first layer consists of a material foam;
a first plurality of second layers that are substantially transparent to the first light signal, wherein each second layer comprises a material having a refractive index that is relatively higher than a refractive index of each first layer, and wherein:
(i) the first plurality of first layers and first plurality of second layers are interleaved,
(ii) each of the first layers and each of the second layers has a thickness that is equal to m*l/4, where m is an odd integer and l is a wavelength included in the first light signal, the first pluralities of interleaved first and second layers defining a first Bragg mirror;
a second plurality of the first layers;
a second plurality of the second layers, wherein:
(i) the second plurality of the first layers and second plurality of the second layers are interleaved, and
(ii) each of the first layers and each of the second layers of the second pluralities has a thickness that is equal to m*l/4, where m is an odd integer and l is a wavelength included in the first light signal, the second pluralities of interleaved first and second layers defining a second Bragg mirror; and
a gap separating the first and second Bragg mirrors.

* * * * *